(12) United States Patent
Inada

(10) Patent No.: US 11,077,716 B2
(45) Date of Patent: Aug. 3, 2021

(54) TIRE

(71) Applicant: Sumitomo Rubber Industries, Ltd., Kobe (JP)

(72) Inventor: Yutaro Inada, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 544 days.

(21) Appl. No.: 15/933,022

(22) Filed: Mar. 22, 2018

(65) Prior Publication Data
US 2018/0290496 A1 Oct. 11, 2018

(30) Foreign Application Priority Data
Apr. 6, 2017 (JP) .............................. JP2017-076146

(51) Int. Cl.
    *B60C 11/11* (2006.01)
    *B60C 11/12* (2006.01)
    (Continued)

(52) U.S. Cl.
    CPC ........... *B60C 11/0309* (2013.01); *B60C 11/11* (2013.01); *B60C 11/12* (2013.01); *B60C 11/1204* (2013.01); *B60C 11/124* (2013.01); *B60C 11/125* (2013.01); *B60C 11/1236* (2013.01); *B60C 11/1307* (2013.01);
    (Continued)

(58) Field of Classification Search
CPC ..... B60C 11/11; B60C 11/12; B60C 11/1236; B60C 2011/0346; B60C 2011/0381; B60C 2011/0383; B60C 11/1307; B60C 2011/133; B60C 2011/1338
See application file for complete search history.

(56) References Cited

U.S. PATENT DOCUMENTS 5,031,680 A * 7/1991 Kajikawa ................ B60C 11/14
    152/209.18
D411,819 S * 7/1999 Blankenship ................ D12/594
(Continued)

FOREIGN PATENT DOCUMENTS

| EP | 393873 A2 * | 10/1990 |
| JP | 11-157308 A * | 6/1999 |
| JP | 5444487 B2 | 3/2014 |

OTHER PUBLICATIONS machine translation for Japan 11-157308 (Year: 2020).*

*Primary Examiner* — Steven D Maki
(74) *Attorney, Agent, or Firm* — Birch, Stewart, Kolasch & Birch, LLP (57) ABSTRACT

A tire includes a tread portion including a main groove, a first block and a second block which are adjacent to one another in a tire axial direction through the main groove. The main groove includes first groove elements and second groove elements having groove widths smaller than that of the first groove elements. The first block includes a first ground contact surface, a first sidewall facing one of the second groove elements, a first corner portion between the first ground contact surface and the first sidewall, and a first recess being cut out the first corner portion locally. The second block includes a second ground contact surface, a second sidewall facing said one of the second groove elements, a second corner portion between the second ground contact surface and the second sidewall, and a second recess being cut out the second corner portion locally.

13 Claims, 7 Drawing Sheets

(51) Int. Cl.
*B60C 11/13* (2006.01)
*B60C 11/03* (2006.01)
*B60C 11/24* (2006.01)

(52) U.S. Cl.
CPC ....... *B60C 11/24* (2013.01); *B60C 2011/0346* (2013.01); *B60C 2011/0355* (2013.01); *B60C 2011/0381* (2013.01); *B60C 2011/0383* (2013.01); *B60C 2011/1209* (2013.01); *B60C 2011/1213* (2013.01); *B60C 2011/133* (2013.01); *B60C 2011/1338* (2013.01)

(56) References Cited

U.S. PATENT DOCUMENTS

2010/0051154 A1* 3/2010 Ebiko ................. B60C 11/0306
  152/209.18
2011/0056601 A1* 3/2011 Ebiko .................. B60C 11/005
  152/209.16

\* cited by examiner

TIRE

BACKGROUND ART

Field of the Invention

The present disclosure relates to tires, and more particularly to a tire which is suitable for traveling in soft ground such as mud and the like.

Description of the Related Art

Four-wheel drive passenger vehicles are often used for traveling in soft ground, such as mud ground and the like. It has been known that tires used for such vehicles, for example, have large groove void volume in order to improve mud performance such as generating traction and discharging mud from grooves.

Unfortunately, tires having large groove void volume as such tend to generate large traveling noise since compressed air by grooves, upon grounding on dry road condition, vibrates largely.

SUMMARY OF THE INVENTION

The present disclosure has been made in view of the above circumstances and has an object to provide tires capable of improving mud performance while maintaining noise performance.

In one aspect of the disclosure, a tire includes a tread portion including a circumferentially extending main groove, a first block and a second block which are adjacent to one another in a tire axial direction through the main groove. The main groove includes first groove elements and second groove elements having groove widths smaller than groove widths of the first groove elements, and the first groove elements and second groove elements are arranged alternately in a tire circumferential direction. The first block includes a first ground contact surface, a first sidewall facing one of the second groove elements, a first corner portion between the first ground contact surface and the first sidewall, and a first recess being cut out the first corner portion locally. The second block includes a second ground contact surface, a second sidewall facing said one of the second groove elements, a second corner portion between the second ground contact surface and the second sidewall, and a second recess being cut out the second corner portion locally.

In another aspect of the disclosure, the groove widths of the first groove elements may be in a range of from 1.5 to 3.0 times the groove widths of the second groove elements.

In another aspect of the disclosure, circumferential lengths of the second groove elements may be in a range of from 0.5 to 1.5 times circumferential lengths of the first groove elements.

In another aspect of the disclosure, the first block may be arranged on a side of a tire equator with respect to the second block, the first recess may have a trapezoidal-shaped opening edge on the first ground contact surface, and an opening length of the opening edge measured along a longitudinal direction of said one of the second groove elements may increase gradually toward said one of the second groove elements.

In another aspect of the disclosure, in a plan view of the tread portion, a maximum axial width of the first recess may be in a range of from 5% to 25% a maximum axial width of the first block.

In another aspect of the disclosure, a depth of the first recess may be in a range of from 50% to 85% of a depth of the main groove.

In another aspect of the disclosure, the first block may be provided with a first sipe in communication with the first recess, and the second block may be provided with a second sipe in communication with the second recess.

In another aspect of the disclosure, the first sipe may extend from a circumferential end of the first recess, and the second sipe may extend from a circumferential end of the second recess.

In another aspect of the disclosure, the first block may be arranged on a tire equator, and a second block is arranged on axially each side of the first block.

In another aspect of the disclosure, a maximum axial width of the first recess may be in a range of from 5% to 25% a maximum axial width of the first block, and a depth of the first recess may be in a range of from 50% to 85% of a depth of the main groove.

In another aspect of the disclosure, a maximum axial width of the second recess may be in a range of from 5% to 20% a maximum axial width of the second block, and a depth of the second recess may be in a range of from 50% to 85% of a depth of the main groove.

DESCRIPTION OF THE PREFERRED EMBODIMENTS

An embodiment of the present disclosure will be explained below with reference to the accompanying drawings.

Figure 1:
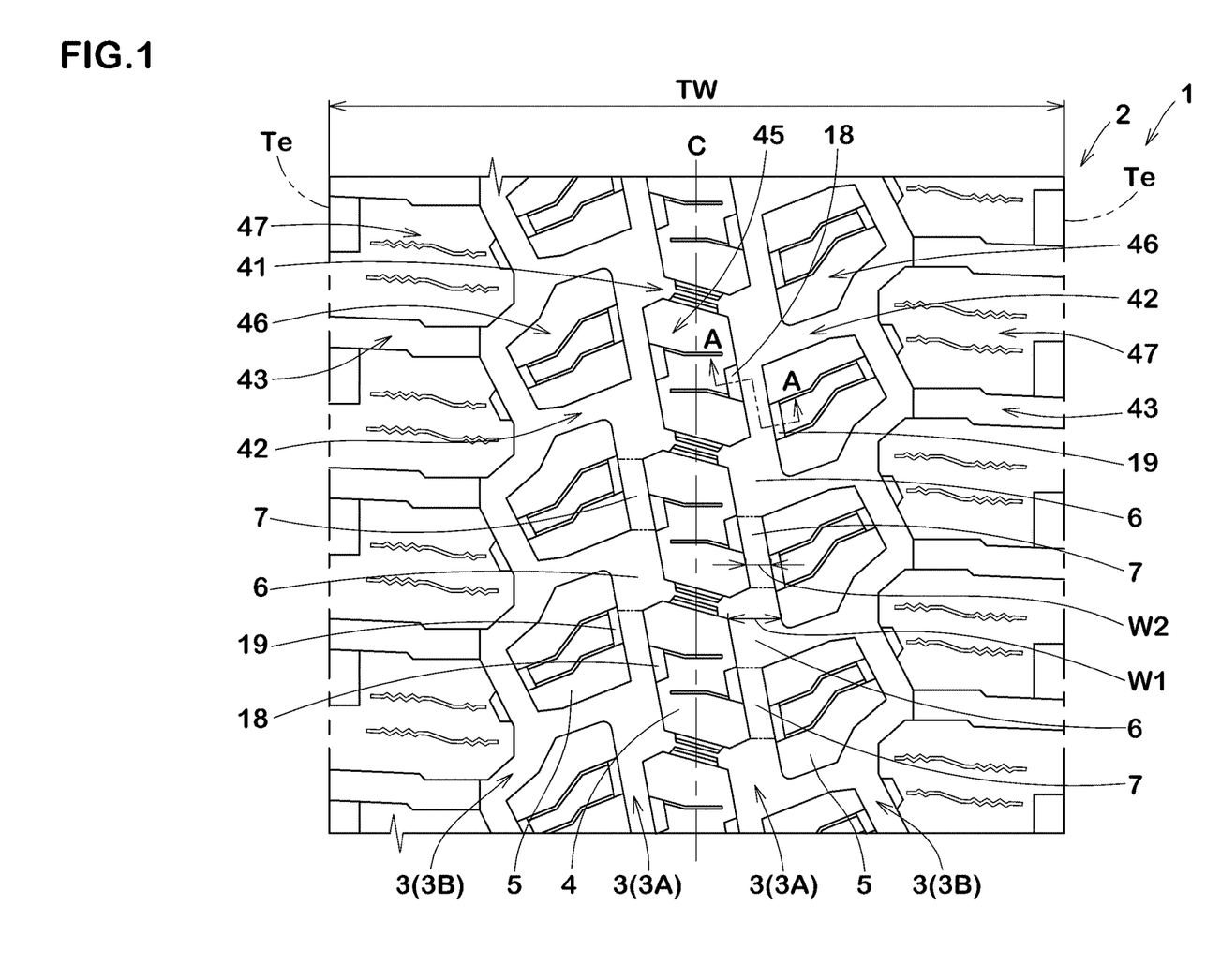
FIG. 1 is a development view of a tread portion of a tire according to an embodiment of the present disclosure.

FIG. 1 illustrates a development view of a tread portion 2 of a tire 1 according to an embodiment of the present disclosure. In this embodiment, as a preferred embodiment, a passenger car tire for four-wheel drive vehicles is illustrated. Note that the present disclosure is not limited to the above aspect, but can be embodied as tires of the other different categories, e.g., heavy duty tires and the like.

Figure 2:
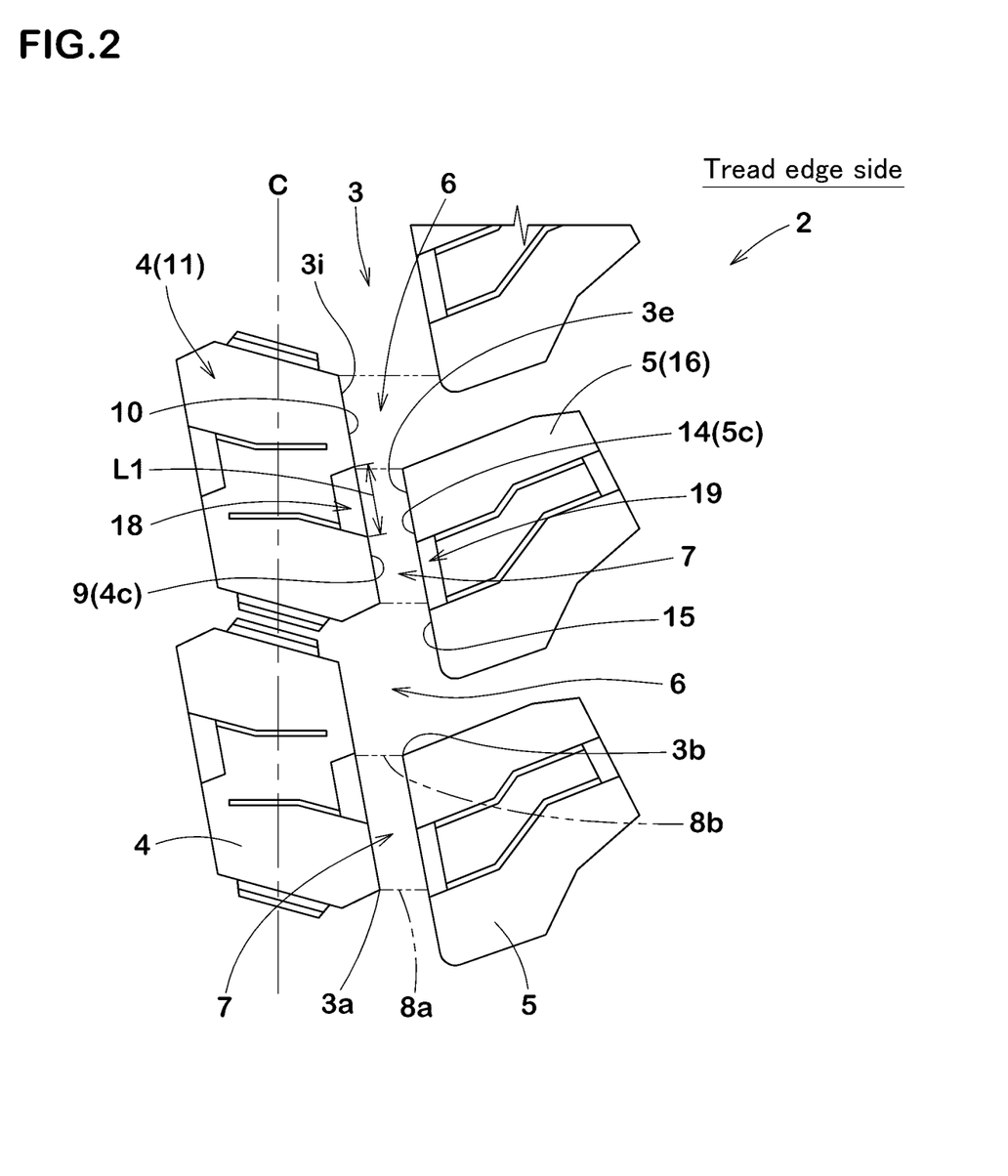
FIG. 2 is a partial enlarged view of the tread portion of FIG. 1.

FIG. 2 illustrates a partial enlarged view of the tread portion 2 of FIG. 1. As illustrated in FIG. 2, the tread portion 2 in accordance with the present embodiment is provided with at least one circumferentially extending main groove 3, at least one first block 4 and at least one second block 5 which are adjacent to one another in the tire axial direction through the main groove 3.

The main groove 3, in this embodiment, includes first groove elements 6 and second groove elements 7. The second groove elements 7 each have a groove width smaller than that of each of the first groove elements 6, and the first groove elements 6 and second groove elements 7 are arranged alternately in the tire circumferential direction. Since the main groove 3 as such includes a pair of groove edges 3*e* and 3*i* which include axial edge components to shear compressed mud by the main groove 3, mud performance can be improved. Further, since the main groove 3 as such may disturb vibration of air which is compressed therein upon grounding using a portion between adjacent first groove element 6 and the second groove element 7, noise performance can be improved.

The main groove 3, in this embodiment, extends continuously in the tire circumferential direction. The first groove elements 6 and the second groove elements 7, in this embodiment, are arranged alternately and repeatedly in the tire circumferential direction in order to exert the above effect continuously during running.

In this embodiment, each of the first groove elements 6 and second groove elements 7 is defined as a portion between adjacent first and second axial lines 8*a* and 8*b*. The first axial lines 8*a* are lines each extend in parallel with the tire axial direction passing a point 3*a* of the groove edge 3*i* which protrudes most toward a side of the groove edge 3*e*. The second axial lines 8*b* are lines each extend in parallel with the tire axial direction passing a point 3*b* of the groove edge 3*e* which protrudes most toward a side of the groove edge 3*i*. In this embodiment, the main groove 3 is configured such that the first and second axial lines 8*a* and 8*b* appear alternately in the tire circumferential direction.

In this embodiment, a plurality of first blocks 4 and a plurality of the second blocks 5 are arranged each spaced in the tire circumferential direction.

The first blocks 4 each include a first ground contact surface 11, a first sidewall 9 facing one of the second groove elements 7 and a first corner portion 4*c* between the first ground contact surface 11 and the first sidewall 7. In this embodiment, the first blocks 4 each further include a first sub-sidewall 10 facing one of the first groove elements 6. The second blocks 5 each include a second ground contact surface 16, a second sidewall 14 facing one of the second groove elements 7 and a second corner portion 5*c* between the second ground contact surface 16 and the second sidewall 14. In this embodiment, the second blocks 5 each further include a second sub-sidewall 15 facing one of the first groove elements 6.

Each first block 4 is provided with a first recess 18 in which the first corner portion 4*c* is cut out locally. Each second block 5 is provided with a second recess 19 in which the second corner portion 5*c* is cut out locally. The first recess 18 and the second recess 19 generate shearing force in mud road and the like, leading to better mud performance. Since the second groove elements 7 tend to compress mud strongly, the first recess 18 and the second recess 19 which are facing one second groove element 7 may generate larger shearing force in mud road. Note that the first and second recesses 18 and 19 being cut out locally respectively mean to exclude the aspect that the first sidewall 9 and the second sidewall 14 are cut out as a whole length along the longitudinal direction of the main groove 3. Further, note that the first and second recesses 18 and 19 being cut out locally respectively mean to exclude the aspect that the first sidewall 9 and the second sidewall 14 are cut out as a whole height along the tire radial direction.

The first block 4, for example, is arranged on a side of the tire equator C with respect to the second block 5. In a plan view of the tread portion 2, the first recess 18 has a trapezoidal-shaped opening edge on the first ground contact surface 11, and an opening length L1 of the opening edge measured along a longitudinal direction of said one of the second groove elements 7 increases gradually toward said one of the second groove elements 7. The first block 4 on the side of the tire equator C tends to receive relatively large ground contact pressure, mud and the like in the first recess 18 tends to be compressed more strongly, leading to powerful mud traction. Further, mud in the first recess 18, in a contact patch, may be pushed into the main groove 3 smoothly, leading to better mud discharging performance. Alternatively, the first block 4 may be arranged axially outwardly with respect to the second block 5.

Figure 3:
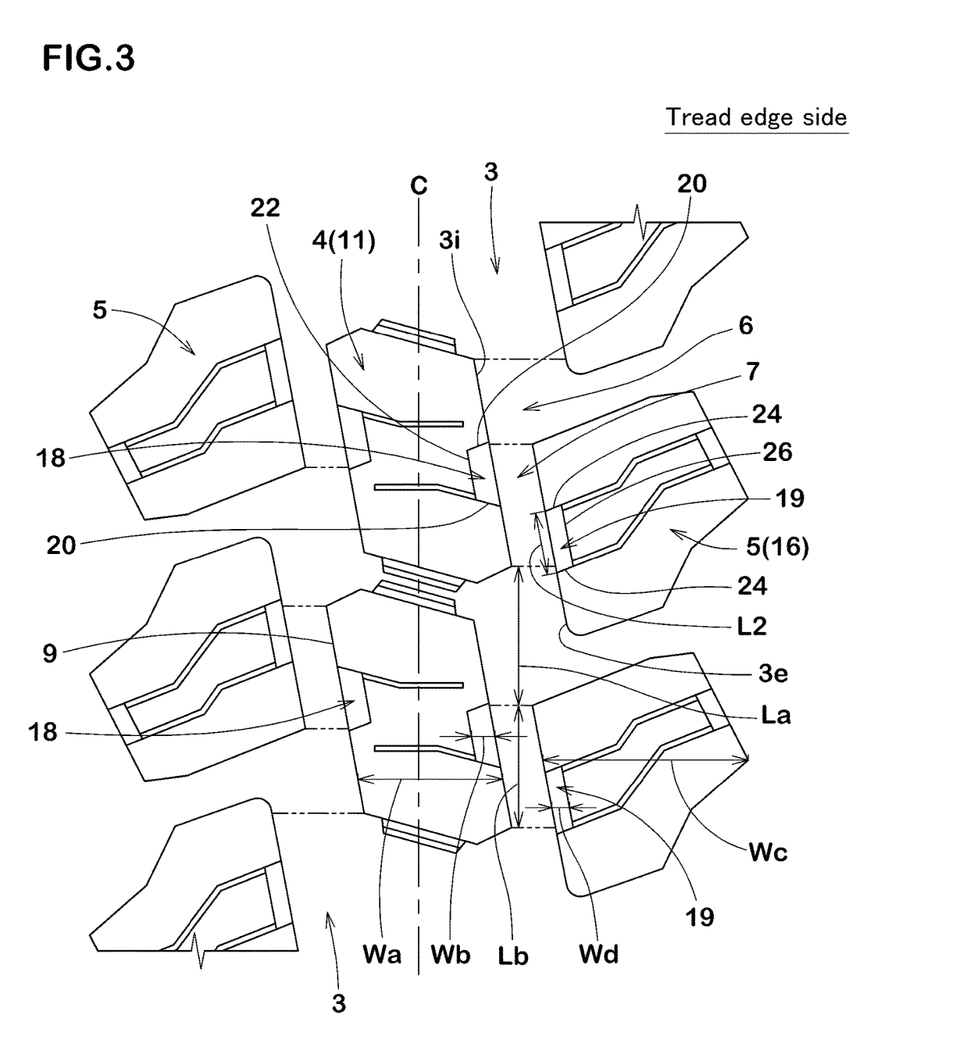
FIG. 3 is an enlarged view illustrating a first block and a second block.

FIG. 3 illustrates a partial enlarged view of the tread portion 2 of FIG. 1. As illustrated in FIG. 3, in the first ground contact surface 11 of each first block 4, the opening edge of the first recess 18 includes two axial edges 20 and a circumferential edge 22. The axial edges 20 extend in a straight manner from the groove edge 3*i* of the main groove 3 in an opposite direction to the second groove element 7 of the main groove 3 in the tire axial direction. In this embodiment, the axial edges 20 are arranged such that the first recess includes the center location position of the first block in the tire circumferential direction. The circumferential edge 22 extends in the tire circumferential direction to connect the two axial edges 20. The circumferential edge 22, in this embodiment, extends in a straight manner and in parallel with the second groove element 7. The first recess 18 as such may suppress reduction in rigidity of the first block 4, maintaining high steering stability on dry road condition (hereinafter, simply referred to as "steering stability").

The second recess 19 of each second block 5, in this embodiment, has an opening edge having a rectangular shape. In some preferred embodiment, the opening edge of the second recess 19 may be configured as a parallelogram shape which has a length L2 along the longitudinal direction of the second groove element of the main groove 3 being constant. The second recess 19 as such also generate mud shearing force.

The opening edge of the second recess 19 on the second ground contact surface 16 includes two axial edges 24 and a circumferential edge 26. The axial edges 24 extend in a straight manner from the groove edge 3*e* of the main groove 3 in an opposite direction to the first block 4 in the tire axial direction. The circumferential edge 26 extends in the tire circumferential direction to connect two axial edges 24. The circumferential edge 26, in this embodiment, extends in a straight manner and in parallel with the second groove element 7. The second recess 19 as such may suppress reduction in rigidity of the second block 5, maintaining high steering stability.

Figure 4:
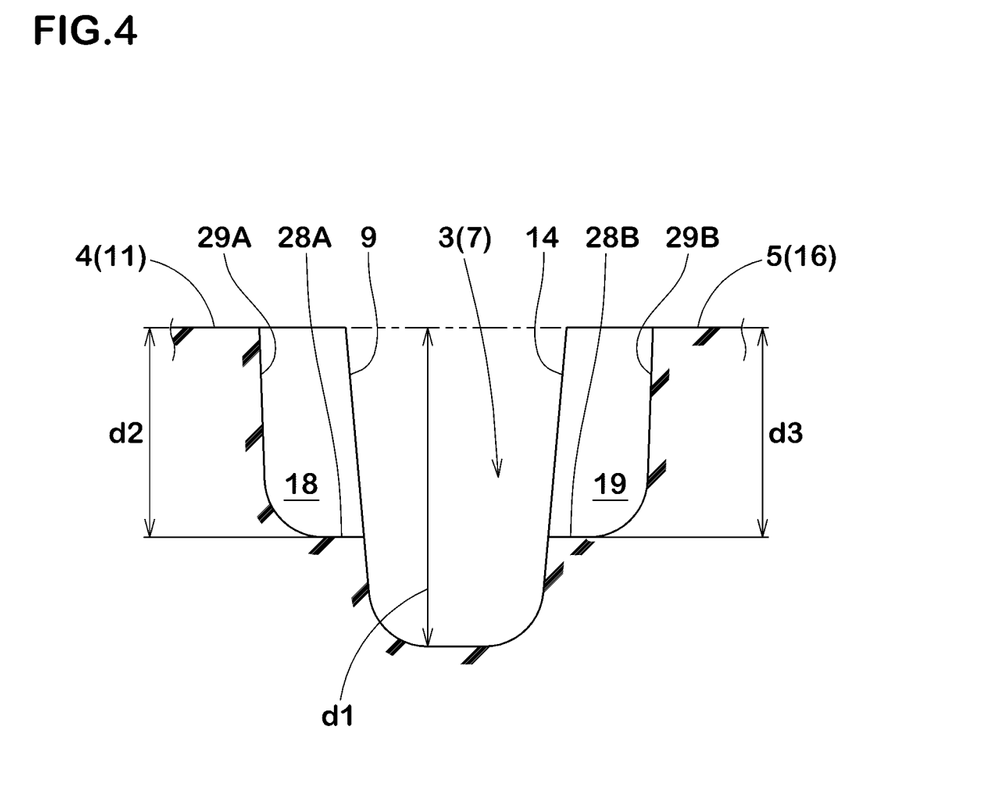
FIG. 4 is a cross-sectional view taken along line A-A of FIG. 1.

FIG. 4 illustrates a cross-sectional view taken along line A-A of FIG. 1. As illustrated in FIG. 4, the first recess 18, in this embodiment, includes a recess bottom portion 28A extending along the first ground contact surface 11 and a recess wall portion 29A extending along the first sidewall 9 connecting the recess bottom portion 28A and the first ground contact surface 11. The first recess 18 as such may provide a large void to hold mud while maintaining rigidity of the first block 4. The recess bottom portion 28A, in this embodiment, includes a portion extending in parallel with the first ground contact surface 11.

The second recess 19, same as the first recess 18, is configured to include a recess bottom portion 28B and a recess wall portion 29B.

Preferably, a depth d2 of the first recess 18 is in a range of from 50% to 85% of the depth d1 of the main groove 3. When the depth d2 of the first recess 18 is less than 50% of the depth d1 of the main groove 3, there may be a possibility that mud performance is deteriorated due to lowering mud shearing force since the first recess 18 can catch less mud. When the depth d2 of the first recess 18 is more than 85% of the depth d1 of the main groove 3, there may be a possibility that steering stability is deteriorated due to reduction in rigidity of the first block 4.

As illustrated in FIG. 3, preferably, an axial maximum width Wb of the first recess 18 is in a range of from 5% to 25% of an axial maximum width Wa of the first block 4. When the width Wb of the first recess 18 is less than 5% of the width Wa of the first block 4, there may be a possibility that mud performance is deteriorated due to lowering mud shearing force since the first recess 18 can catch less mud. When the width Wb of the first recess 18 is more than 25% of the width Wa of the first block 4, there may be a possibility that steering stability is deteriorated due to reduction in rigidity of the first block 4.

In order to further improve the above effect, the first recess 18 preferably has an average length along the second groove element 7 is in a range of from 35% to 65% of a length Lb of the second groove element 7 in the tire circumferential direction.

In the same point of view, preferably, a depth d3 of the second recess 19 (shown in FIG. 4) is in a range of from 50% to 85% of the depth d1 of the main groove 3. Further, preferably, an axial maximum width Wd of the second recess 19 is in a range of from 5% to 20% of an axial maximum width We of the second block 5. Furthermore, the second recess 19 preferably has an average length measured along the second groove element 7 is in a range of from 35% to 65% of the length Lb of the second groove element 7 in the tire circumferential direction.

In some preferred embodiments, as shown in FIG. 3, the tread portion 2 may include at least two main grooves 3 such that each one is arranged on axially each side of the first block 4, and at least two second blocks 5 which include one being arranged on the left side of the first block 4 and other one being arranged on the right side of the first block 4. In this aspect, the first block 4 includes a pair of the first sidewalls 9 on axially both sides thereof, wherein each of the first sidewalls 9 is provided with the first recess 18 as described above.

Figure 5:
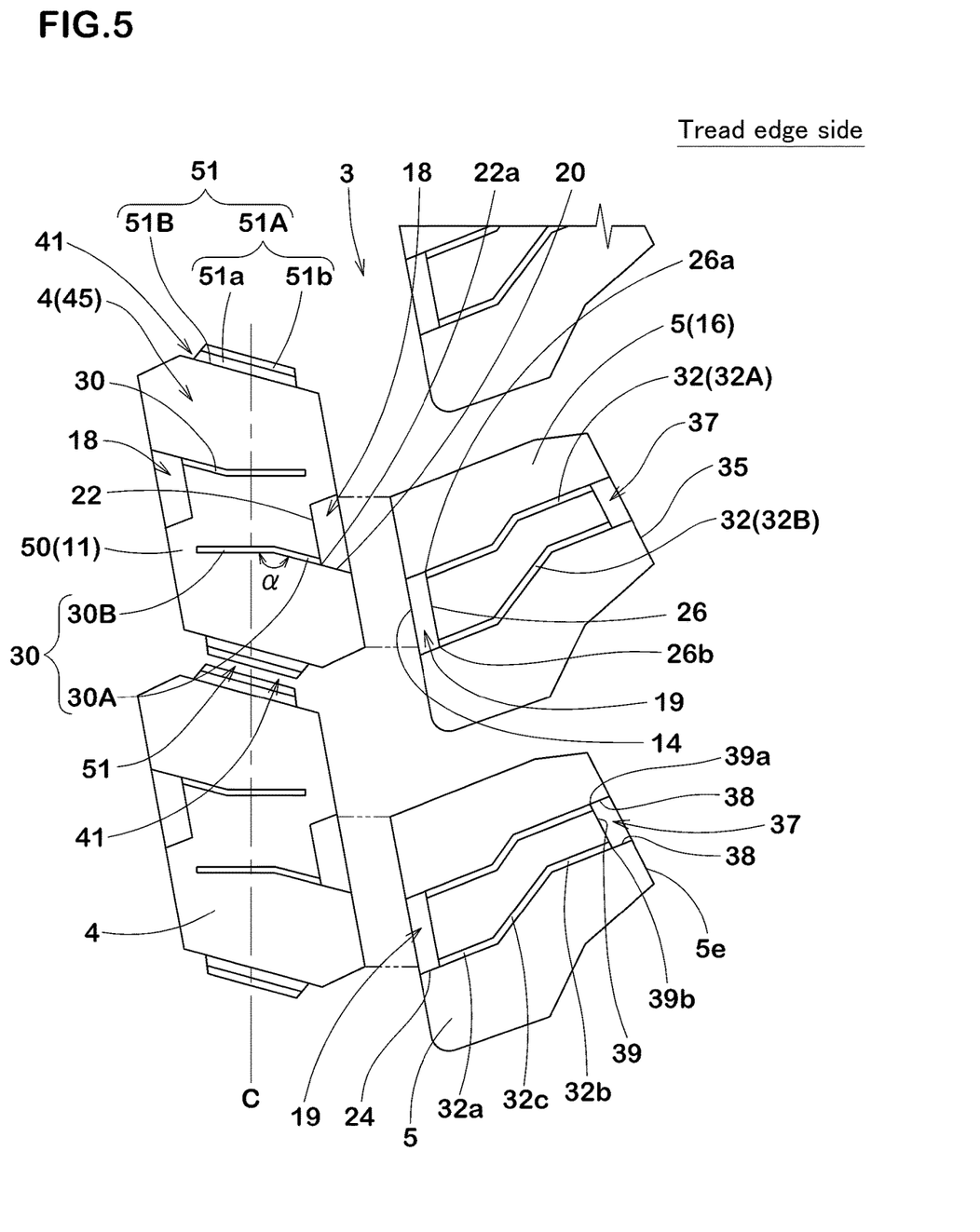
FIG. 5 is an enlarged view illustrating the first block and the second block.

FIG. 5 illustrates a partial enlarged view of first blocks 4 and second blocks 5. As illustrated in FIG. 5, the first blocks 4 each are provided with a first sipe 30 in communication with the first recess 18. The edges of the first sipe may scratch wet ground to discharge water, resulting in improving wet performance. As used herein, a "sipe" shall mean a narrow cut having a width equal to or less than 1.5 mm, and a "groove" shall mean a cut having a width more than 1.5 mm.

Preferably, the first sipe 30 extends from a circumferential end of the first recess 18, more specifically, from an end 22a of one of the circumferential edges 22. Thus, stress acting on one end of the first recess 18 can be relaxed, resulting in suppressing damage of the first block 4 around the first recess 18.

The first sipe 30 includes an outer portion 30A in communication with the axial edge 20 smoothly and an inner portion 30B terminating within the first block 4. In this embodiment, the outer portion 30A is arranged so as to form a continuous edge with the axial edge 20, leading to drain water on the ground effectively.

The outer portion 30A, in this embodiment, extends in a straight manner, and is inclined at an angle with respect to the tire axial direction. The inner portion 30B, in this embodiment, extends in a straight manner having an angle with respect to the tire axial direction which is smaller than that of the outer portion 30A. In this embodiment, the inner portion 30B extends along the tire axial direction, i.e., having the angle within 5 degrees with respect to the tire axial direction. Due to the first sipe 30 as such, the first recess 18 of the first block 4 tends to deform flexibly upon grounding, resulting in discharging mud from the first recess 18 effectively. Note that regarding a sipe or groove, extending "along the tire axial direction" shall mean a sipe or groove has an angle of 5 degrees or less with respect to the tire axial direction.

In order to further improve mud performance while suppressing excessive reduction in rigidity of the first block 4, an angle between the outer portion 30A and the inner portion 30B is preferably in a range of from 150 to 170 degrees, for example.

The second block 5, in this embodiment, further includes a third sidewall 35 arranged axially outside the second block 5 and a third corner portion 5e between the third sidewall 35 and the second ground contact surface 16. The second blocks 5, in this embodiment, each are provided with an outer recess 37 being cut out on the third corner portion 5e locally.

The outer recess 37 includes an opening edge on the second ground contact surface 16, and the opening edge includes two second axial edges 38 and a second circumferential edge 39. The second axial edges 38 extend from the third corner portion 5e toward the second recess 19. The second axial edges 38, in this embodiment, extend in a straight manner. The second circumferential edge 39 extends in the tire circumferential direction to connect both second axial edges 38. The second circumferential edge 39, in this embodiment, extends in a straight manner in parallel with the third corner portion 5e in a plan view of the tread portion 2. The outer recess 37 as such suppress excessive reduction in rigidity of the second block 5, maintaining high steering stability of the tire.

Preferably, the second block 5s each are provided with one or more second sipes 32 in communication with the second recess 19. The edges of the second sipes 32 may scratch wet ground to discharge water, resulting in improving wet performance.

Two second sipes 32, in this embodiment, are provided on each second block 5 in order to further improve wet performance. Alternatively, only one second ripe 32 may be provided on each second block 5.

In this embodiment, one of the second sipes 32A extends from an end 26a of one of the circumferential edge 26 of the second recess 19, and the other one of the second sipes 32B extends from an end 26b of the other one of the circumferential edge 26 of the second recess 19 in order to further improve the above effect.

The second sipes 32, in this embodiment, are in communication with the outer recess 37. The one and the other one of the second sipes 32, in this embodiment, are respectively in communication with an end 39a and an end 39b of the second circumferential edge 39 of the outer recess 37.

The second sipes 32 are inclined in a first direction with respect to the tire axial direction (e.g., upward to the right in FIG. 5). The second sipes 32, in this embodiment, each include an inner portion 32a, an outer portion 32b and a middle portion 32c. The inner portion 32a, in this embodiment, is arranged so as to be continuous smoothly with one of the axial edges 24 in such a manner as to form a single straight line. The outer portion 32b is arranged so as to be continuous smoothly with one of the second axial edges 38 in such a manner as to form a single straight line. The middle portion 32c extends in a straight manner to connect the inner portion 32a and the outer portion 32b. The middle portion 32c, for example, is inclined at an angle with respect to the tire axial direction which is greater than that of the inner portion 32a and the outer portion 32b in order to suppress excessive reduction in rigidity of the second block 5.

As illustrated in FIG. 1, as the at least one main groove 3, the tread portion 2 is provided with two crown main grooves 3A and two shoulder main grooves 3B. In this embodiment, the crown main grooves 3A extend continuously in the tire circumferential direction, and each are arranged nearer to the tire equator C than the other main grooves on each side of the tire equator C. In this embodiment, the shoulder main grooves 3B extend continuously in the tire circumferential direction, and are arranged axially both outer side of the crown main groove 3A between tread edges Te.

As used herein, the tread edges Te are the axial outermost edges of the ground contacting patch of the tread portion 2 which occurs under a condition where the tire being under a standard condition is grounded on a plane with a standard tire load at zero camber. Note that the tread width TW is defined as a distance in the tire axial direction between the tread edges Te under the standard condition. In this application including specification and claims, various dimensions, positions and the like of the tire refer to those under the standard condition of the tire unless otherwise noted.

As used herein, the standard wheel rim is a wheel rim officially approved for the tire by standards organizations, wherein the standard wheel rim is the "standard rim" specified in JATMA, the "Measuring Rim" in ETRTO, and the "Design Rim" in TRA or the like, for example.

As used herein, the standard pressure is a standard pressure officially approved for the tire by standards organizations, wherein the standard pressure is the "maximum air pressure" in JATMA, the "Inflation Pressure" in ETRTO, and the maximum pressure given in the "Tire Load Limits at Various Cold Inflation Pressures" table in TRA or the like, for example.

As used herein, the standard tire load is a tire load officially approved for the tire by standards organizations, wherein the standard tire load is the "maximum load capacity" in JATMA, the "Load Capacity" in ETRTO, and the maximum value given in the above-mentioned table in TRA or the like.

The crown main grooves 3A, in this embodiment, preferably include the above-mentioned first groove elements 6 and the second groove elements 7. The shoulder main grooves 3B, in this embodiment, may be configured irrespective of whether or not they include the first groove elements 6 and the second groove elements 7. Alternatively, the crown main grooves 3A may be configured irrespective of whether or not they include the first groove elements 6 and the second groove elements 7. Further, the shoulder main grooves 3B may be configured as grooves including the first groove elements 6 and the second groove elements 7.

Preferably, groove widths (i.e., maximum widths in the tire axial direction) W1 of the first groove elements 6 are in a range of from 1.5 to 3.0 times groove widths (i.e., maximum widths in the tire axial direction) W2 of the second groove elements 7. When the groove widths W1 of the first groove elements 6 are less than 1.5 times the groove widths W2 of the second groove elements 7, mud performance may be deteriorated since axial components of the groove edges 3e and 3i become small. Further, the main groove 3 as such may be difficult to improve noise performance since the effect that disturbs air vibration in the main grooves lowers. When the groove widths W1 of the first groove elements 6 are more than 3.0 times the groove widths W2 of the second groove elements 7, steering stability of the tire may be deteriorated since lateral rigidity of blocks 4 and 5 adjacent to the first groove elements 6 may lower.

Preferably, as shown in FIG. 3, lengths Lb of the second groove elements 7 in the tire circumferential direction are in a range of from 0.5 to 1.5 times lengths La of the first groove elements 6 in the tire circumferential direction. When the lengths Lb of the second groove elements 7 in the tire circumferential direction are less than 0.5 times the lengths La of the first groove elements 6 in the tire circumferential direction, noise performance may be deteriorated since groove volume of the main groove 3 becomes large. Further, since rigidity of blocks 4 and 5 adjacent to the main grooves tends to lower, steering stability may be deteriorated. When the lengths Lb of the second groove elements 7 in the tire circumferential direction are more than 1.5 times the lengths La of the first groove element 6 in the tire circumferential direction, wet performance may be deteriorated since groove volume of the main groove 3 becomes small.

Referring back to FIG. 1, the shoulder main grooves 3B, in this embodiment, extend in a zigzag manner, leading to better mud performance due to its lateral components. The shoulder main grooves 3B as such may improve noise performance since they disturb generating standing wave therein.

The tread portion 2, in this embodiment, is further provided with crown lateral grooves 41, middle lateral grooves 42 and shoulder lateral grooves 43 to define crown blocks 45, middle blocks 46 and shoulder blocks 47, respectively. The crown blocks 45, in this embodiment, are defined by the crown main grooves 3A and the crown lateral grooves 41 on the tire equator C. The middle blocks 46, in this embodiment, are defined by one crown main groove 3A, one shoulder main groove 3B arranged adjacent to the one crown main groove 3A and the middle lateral grooves 42. The shoulder blocks 47, in this embodiment, are defined by one shoulder main groove 3B, one tread edge Te adjacent to the one shoulder main groove 3B and the shoulder lateral grooves 43.

In this embodiment, each of the crown blocks 45 is provided with the first recess 18, and each of the middle blocks 46 is provided with the second recess 19. That is, each of the crown blocks 45 and each of the middle blocks 46 are respectively configured as the first block 4 and the second block 5. In this embodiment, the first recess 18 and the second recess 19 are provided on blocks 45 and 46 which are subject to relatively large ground contact pressure in order to generate powerful mud shearing force in mud road condition. Note that the first recess 18 and/or the second recess 19 are not limited to the above aspect. For example, the first recess 18 can be provided on the middle blocks 46, and the shoulder blocks 47 can be provided with the first recess 18 or the second recess 19.

As illustrated in FIG. 5, the crown blocks 45 in accordance with the present embodiment, each include a block main body 50 having the first ground contact surface 11 and one or more protrusions 51 protruding from the block main body 50 toward one of the crown lateral grooves 41. The protrusions 51 have top surfaces located radially inwardly from the first ground contact surface 11.

The protrusions 51 in accordance with the embodiment, in a cross-sectional view along a groove-width direction of the crown lateral grooves 41, each are configured as a step-shaped portion which includes one or more step elements 51A extending along the first ground contact surface 11 and one or more riser elements 51B. The protrusions 51 as such may release compressed mud effectively from the crown lateral grooves 41 to suppress clogging since the step elements 51A of protrusions 51 can break the mud stayed in the crown lateral grooves. Thus, mud performance can further be improved.

The step elements 51A, in this embodiment, include two step elements 51a and 51b having different radial heights. Thus, the above-mentioned effect can further be improved while maintaining groove volume of the crown lateral grooves 41.

The protrusions 51, in this embodiment, are provided circumferential both sides of the block main body 50 of each of the crown blocks 45. Thus, the above-mentioned effect can further exert effectively.

Figure 6:
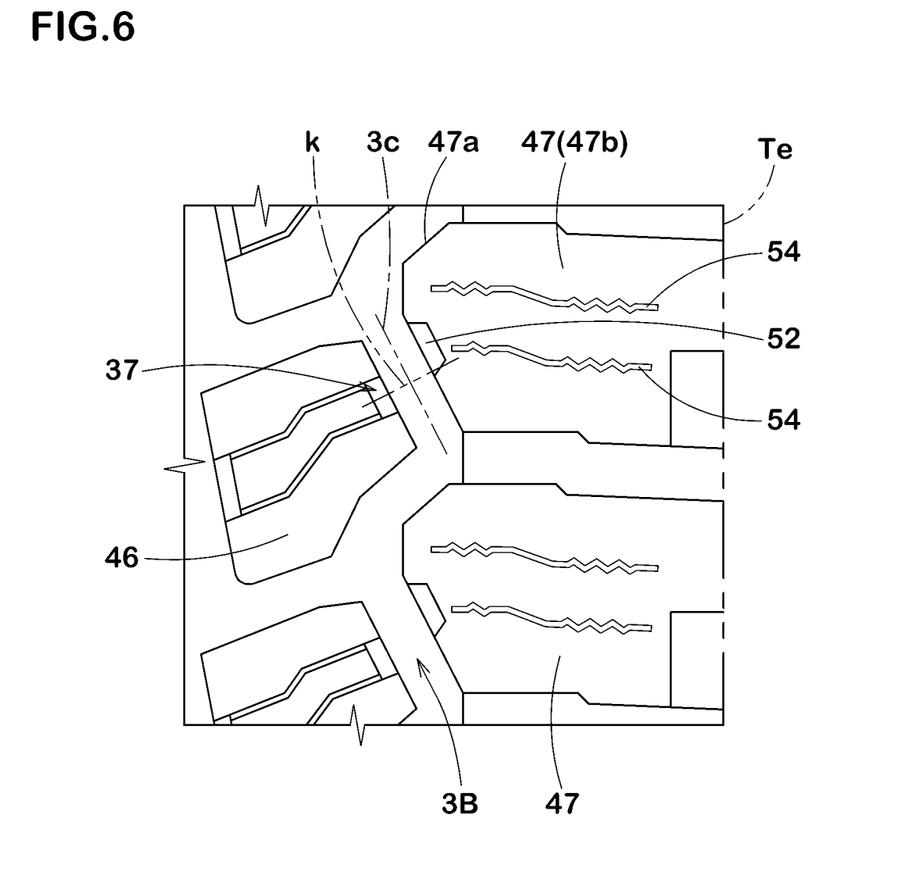
FIG. 6 is a partial enlarged view of FIG. 1 illustrating shoulder blocks and middle blocks.

FIG. 6 illustrates a partial enlarged view of the shoulder blocks 47. As illustrated in FIG. 6, the shoulder blocks 47 each include a ground contact surface 47b, an inner sidewall 47a facing the shoulder main groove 3B and a fourth corner portion therebetween. The shoulder blocks 47, in this embodiment, is provided with a shoulder recess 52 being cut out the fourth corner portion locally. The shoulder recess 52 as such may also improve mud performance to generate mud shearing force.

The shoulder recess 52, in this embodiment, is arranged facing the outer recess 37 through the shoulder main groove 3B. Thus, rigidity of portions of the shoulder blocks 47 around the shoulder recesses 52 and rigidity of portions of the middle blocks 46 around the outer recesses 37 are relaxed suitably, deformation of the shoulder recesses 52 and the outer recesses 37 may be promoted, resulting in discharging mud from these recesses 52 and 37 smoothly. Note that the above-mentioned "facing" shall mean that a straight line K perpendicular to the groove centerline 3c of the shoulder main groove 3B passes both shoulder recess 52 and outer recess 37.

The shoulder blocks 47, in this embodiment, each are provided with one or more shoulder sipes 54 having both ends terminating within the shoulder blocks 47. The shoulder sipes 54 may relax rigidity of the shoulder blocks 47, promoting deformation of the shoulder recess 52 upon grounding, thereby discharging mud from the shoulder recesses 52 smoothly.

While the particularly preferable embodiments in accordance with the present disclosure have been described in detail, the present invention is not limited to the illustrated embodiments, but can be modified and carried out in various aspects.

EXAMPLE

Test tires 265/70R17 for four-wheel drive cars having the basic tread pattern as illustrated in FIG. 1 were manufactured based on the details shown in Table 1. Then, mud performance, noise performance, steering stability and wet performance of each test tire was tested. The common specification of the tires and test procedures are as follows.

Main groove depths d1: 10.5 mm

Test for Mud Performance, Steering Stability and Wet Performance:

The test tires were mounted on a four-wheel drive car with a displacement of 5300 cc as the all wheels under the following condition. Then, a test driver drove the car on the respective test courses of soft road condition covered with mud of 30 cm deep, dry asphalt road condition and a wet asphalt road condition to evaluate mud performance, steering stability and wet performance in view of traction property, steering stability and cornering performance by his sense. The test results are shown in Table 1 using a score wherein the Ref. 1 is set to 100. The larger the score, the better the performance is.

Rim size: 17×8.0J

Tire inner pressure: 240 kPa

Noise Performance Test:

The above test car was coasted on a dry asphalt road at a speed of 60 km/h and the interior car noise was measured with a microphone fixed at a head position of the driver's seat. The evaluation was done using reciprocal of the values of the respective noise intensity (dB). The test results are indicated in Table 1 by an index system based on Ref. 1 being 100, wherein the smaller the index number, the better the noise performance is.

Table 1 shows the test results.

TABLE 1

Figure 7:
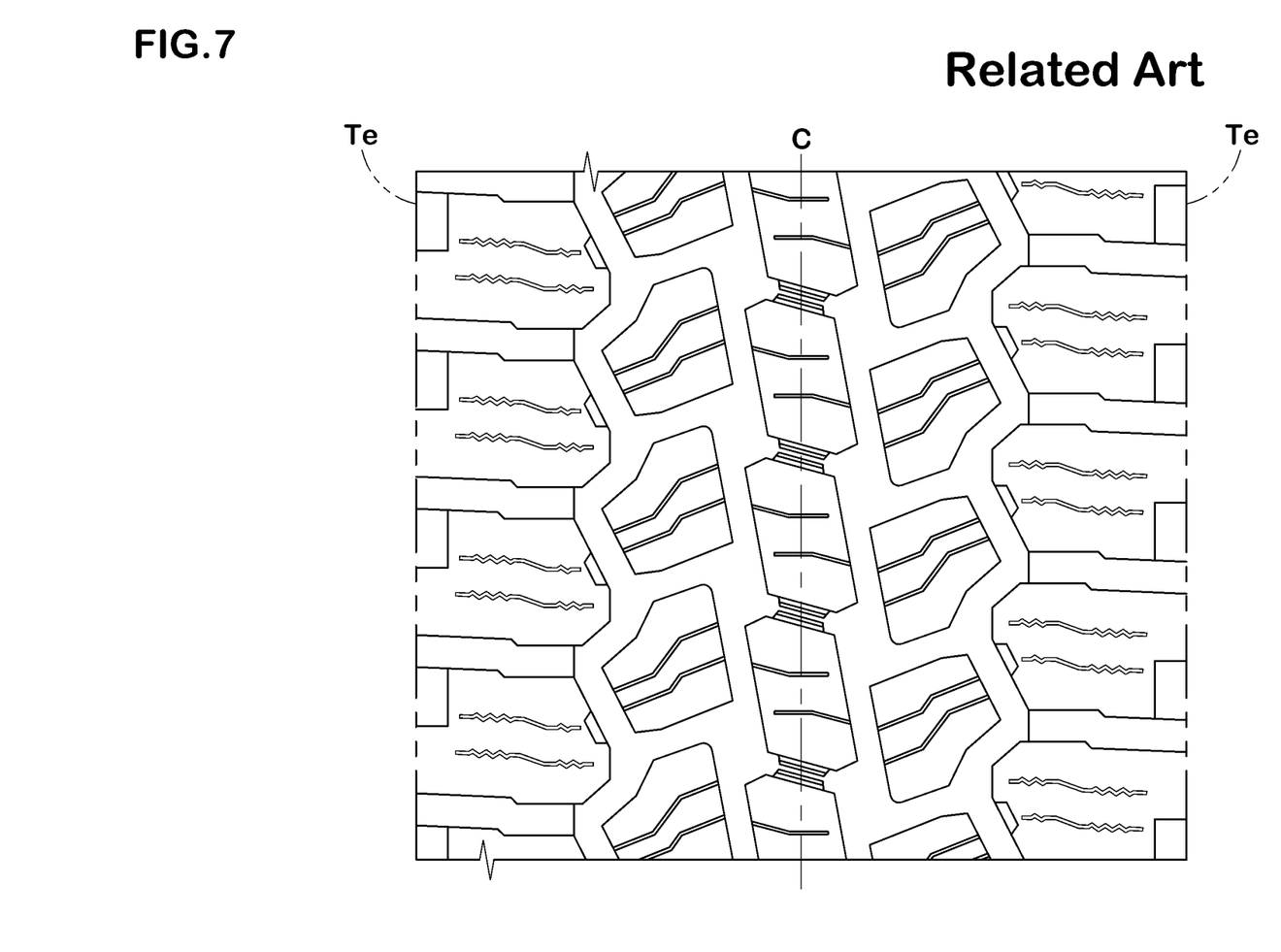
FIG. 7 is a development view of a tread portion illustrating a comparative example tire.

|  | Ref. 1 | Ex. 1 | Ex. 2 | Ex. 3 | Ex. 2 |
|---|---|---|---|---|---|
| Tread portion | FIG. 1 | FIG. 1 | FIG. 1 | FIG. 1 | FIG. 7 |
| First recesses and second recesses | None | Presence | Presence | Presence | None |
| Second groove elements | None | Presence | Presence | Presence | Presence |
| First sipes and second sipes | None | Presence | Presence | None | Presence |
| Recess bottom portions of first recesses and second recesses | — | Presence | Presence | Presence | — |
| First recess depths d2/d1 (%) | — | 55 | 85 | 55 | — |
| Noise performance (index) | 100 | 105 | 100 | 105 | 100 |
| Steering stability (score) | 100 | 105 | 100 | 105 | 100 |
| Wet performance (score) | 100 | 110 | 112 | 105 | 105 |
| Mud performance (score) | 100 | 110 | 112 | 107 | 105 |

From the test results, it is confirmed that the example tires improve mud performance while maintaining noise performance, compared with the comparative example tires (Ref. 1 and Ref. 2). Further, it is also confirmed that the example tires improve wet performance and steering stability in a well-balanced manner.

What is claimed is:

1. A tire comprising:
   a tread portion comprising a circumferentially extending main groove, a first block and a second block which are adjacent to one another in a tire axial direction through the main groove;
   the main groove comprising first groove elements and second groove elements having groove widths smaller than groove widths of the first groove elements, the first groove elements and second groove elements being arranged alternately in a tire circumferential direction;
   the first block comprising a first ground contact surface, a first sidewall facing one of the second groove elements, a first corner portion between the first ground contact surface and the first sidewall, and a first recess being cut out the first corner portion locally; and the second block comprising a second ground contact surface, a second sidewall facing said one of the second groove elements, a second corner portion between the second ground contact surface and the second sidewall, and a second recess being cut out the second corner portion locally, wherein the first block is arranged on a side of a tire equator with respect to the second block, the first block is provided with a first sipe in communication with the first recess, and the second block is provided with a second sipe in communication with the second recess, the first recess has a trapezoidal-shaped opening edge on the first ground contact surface, an opening length of the opening edge measured along a longitudinal direction of said one of the second groove elements increases gradually toward said one of the second groove elements, the first sipe extends from a circumferential first end edge of the first recess, the first sipe comprising a first sipe edge being aligned with the circumferential first end edge of the first recess to form a single straight edge together, and the second sipe extends from a circumferential first end edge of the second recess, the second sipe comprising a first sipe edge being aligned with the circumferential first end edge of the second recess to form a single straight edge together.

2. The tire according to claim 1, wherein the groove widths of the first groove elements are in a range of from 1.5 to 3.0 times the groove widths of the second groove elements.

3. The tire according to claim 2, wherein circumferential lengths of the second groove elements are in a range of from 0.5 to 1.5 times circumferential lengths of the first groove elements.

4. The tire according to claim 1, wherein circumferential lengths of the second groove elements are in a range of from 0.5 to 1.5 times circumferential lengths of the first groove elements.

5. The tire according to claim 1, wherein in a plan view of the tread portion, a maximum axial width of the first recess is in a range of from 5% to 25% a maximum axial width of the first block.

6. The tire according to claim 1, wherein a depth of the first recess is in a range of from 50% to 85% of a depth of the main groove.

7. The tire according to claim 1, wherein the first block is arranged on a tire equator, and a second block is arranged on axially each side of the first block.

8. The tire according to claim 1, wherein a maximum axial width of the first recess is in a range of from 5% to 25% a maximum axial width of the first block, and a depth of the first recess is in a range of from 50% to 85% of a depth of the main groove.

9. The tire according to claim 8, wherein a maximum axial width of the second recess is in a range of from 5% to 20% a maximum axial width of the second block, and a depth of the second recess is in a range of from 50% to 85% of a depth of the main groove.

10. The tire according to claim 1, wherein
the second block is further provided with another second sipe that is in communication with the second recess, and
the another second sipe extends from a circumferential second end edge of the second recess, the another second sipe comprising a second sipe edge being aligned with the circumferential second end edge of the second recess to form a single straight edge together.

11. The tire according to claim 10,
the second block further comprising a third sidewall arranged axially outside the second block, a third corner portion between the third sidewall and the second ground contact surface, and an outer recess being cut out on the third corner portion locally, wherein
the second sipe is connected to a circumferential first end edge of the outer recess, the second sipe comprising a first outer sipe edge being aligned with the circumferential first end edge of the outer recess to form a single straight edge together, and
the another second sipe is connected to a circumferential second end edge of the outer recess, the another second sipe comprising a second outer sipe edge being aligned to the circumferential second end edge of the outer recess to form a single straight edge together.

12. The tire according to claim 1,
the first block further comprising a block main body having the first ground contact surface and at least one protrusion protruding from the block main body toward either one of lateral grooves adjacent to the first block in the tire circumferential direction, wherein
the at least one protrusion has a top surface located radially inwardly from the first ground contact surface,
the at least one protrusion, in a cross-sectional view along a groove-width direction of the lateral groove, has a step-shaped portion that includes two step elements extending along the first ground contact surface and two riser elements.

13. The tire according to claim 12, wherein
the at least one protrusion comprises a pair of protrusions each protruding toward a respective one of the lateral grooves, and
the tread portion includes a block row of a plurality of first blocks arranged in the tire circumferential direction such that two protrusions are facing in the tire circumferential direction in each lateral groove.

* * * * *